(12) United States Patent
Zhang et al.

(10) Patent No.: US 9,769,142 B2
(45) Date of Patent: Sep. 19, 2017

(54) SYSTEMS AND METHODS FOR AUTHENTICATING NETWORK MESSAGES

(71) Applicant: MASTERCARD INTERNATIONAL INCORPORATED, Purchase, NY (US)

(72) Inventors: Jenny Zhang, St. Louis, MO (US); Justus Srigiri, Atlanta, GA (US); Brian Loeffler, Wright City, MO (US); Ankur Panthi, St. Louis, MO (US); Marc Phillips, Wentzville, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 121 days.

(21) Appl. No.: 14/942,048

(22) Filed: Nov. 16, 2015

(65) Prior Publication Data
US 2017/0142085 A1 May 18, 2017

(51) Int. Cl.
*H04L 29/06* (2006.01)
*H04L 29/08* (2006.01)

(52) U.S. Cl.
CPC .............. *H04L 63/08* (2013.01); *H04L 63/10* (2013.01); *H04L 67/02* (2013.01)

(58) Field of Classification Search
CPC .......... H04L 63/08; H04L 63/10; H04L 67/02
See application file for complete search history.

(56) References Cited

U.S. PATENT DOCUMENTS

| 2002/0035685 A1* | 3/2002 | Ono ..................... H04L 63/0281 713/155 |
| 2004/0254848 A1* | 12/2004 | Golan .................... G06Q 20/04 705/50 |
| 2014/0108262 A1* | 4/2014 | Plateaux ............ G06Q 20/3825 705/71 |
| 2015/0229618 A1 | 8/2015 | Wan et al. |

FOREIGN PATENT DOCUMENTS

EP    1189407 A2    3/2002

OTHER PUBLICATIONS

MICROSEC "PassBy[ME] The Next Generation Authentication Technology", Sep. 8, 2014, 8 pages.*
Thomson "Configuring mutual ssl", Oct. 2, 2015, 10 pages.*
MasterCard "MasterCard SecureCode Merchant Implementation Guide", Jun. 17, 2014, 72 pages.*
"Handbook of Applied Cyrptography", Meneyes, Vanstone, Oorschot; 1997, 49 pgs.

* cited by examiner

*Primary Examiner* — Oleg Korsak
(74) *Attorney, Agent, or Firm* — Harness, Dickey & Pierce, P.L.C.

(57) ABSTRACT

Networks and methods for use in authenticating messages, based on the clients and the computing devices, are provided. One exemplary method generally includes performing, by an API gateway, validation of a computing device based on a certificate identifying the computing device as one of the recognized computing devices, via the repository, and performing, by the API gateway, validation of the client (Continued)

based on the client certificate via a global access manager, separate from the repository. The exemplary method further includes causing a security token indicative of the client to be generated, when the computing device and the client are validated, whereby the security token is indicative of the client and permits the message, from the client, to be delivered to one or more backend services.

20 Claims, 3 Drawing Sheets

US 9,769,142 B2

SYSTEMS AND METHODS FOR AUTHENTICATING NETWORK MESSAGES

FIELD

The present disclosure generally relates to systems and methods for use in authenticating messages, for example, network messages, including authenticating messages from clients, and further authenticating computing devices through which the messages are passed.

BACKGROUND

This section provides background information related to the present disclosure which is not necessarily prior art.

Payment networks are provided for various different types of messaging to and from clients, such as merchants, acquirers, issuers, and other entities, and further, in certain instances, among the clients. Because the messages generally include sensitive and/or confidential data, or seek access to sensitive and/or confidential data, known payment networks employ a variety of encryption techniques to protect the data, and may further dictate security conditions for messaging to and/or from the payment networks. Also, payment networks are known to employ security hierarchies, whereby as messaging progresses between different network parts or zones within the payment network, continued authentication of the message is needed to ensure security of the payment network.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

Payment networks provide a variety of services, which may relate to payment account transactions and/or use of transaction data, that rely on access to the payment networks by one or more other entities (broadly, clients), both internal and external, etc. Access is provided in the form of messages received, by the payment network, from the clients. As described herein, each of the messages includes a security certificate, which is utilized by the payment network to authenticate the clients. Moreover, the networks (e.g., payment networks, etc.) and methods herein authenticate messages (e.g., application programming interface (API) messages, etc.) at multiple levels. In particular, when a message is received at the payment network from a client, a computing device appends the client certificate to the message as an object, and further appends its own certificate to the message, prior to transmitting the message onto an API gateway. In turn, the API gateway validates the certificate of the computing device (from which the API gateway received the message), based on a local repository within the API gateway, and further validates the client certificate, i.e., the appended object, via a global access manager apart from the API gateway. Upon the multi-level authentication (e.g., at the client level and the computing device level, etc.), the API gateway causes a security token to be generated, which is indicative of the client and usable within the payment network to access backend servers and/or services provided thereby. In this manner, security is enhanced to keep transaction data and other data within the payment network protected from unauthorized access.

Figure 1:
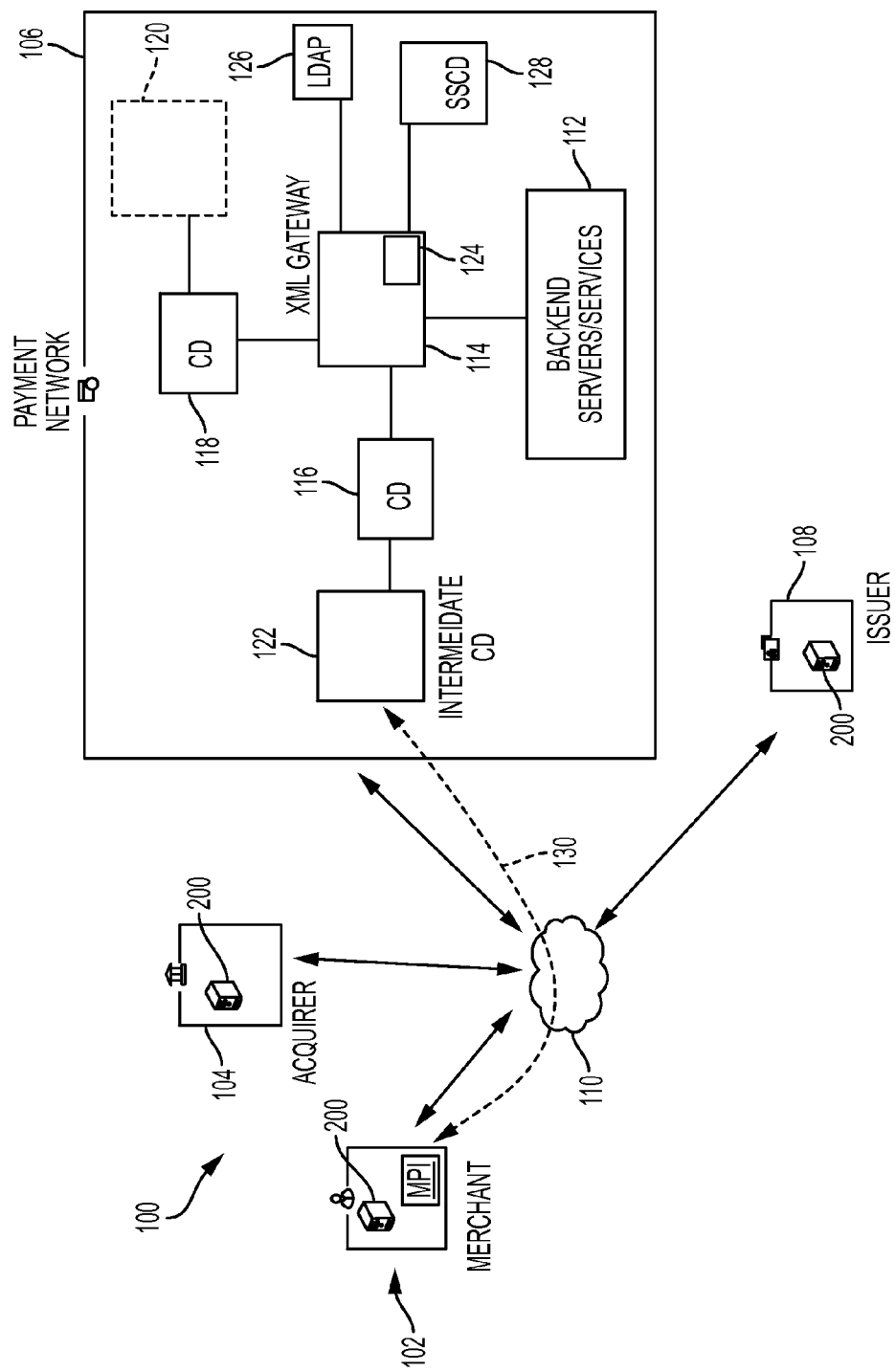
FIG. 1 is a block diagram of an exemplary system of the present disclosure, including a payment network suitable to authenticate messages transmitted to the payment network.

FIG. 1 illustrates an exemplary system 100 in which one or more aspects of the present disclosure may be implemented. Although parts of the system 100 are presented in one arrangement, it should be appreciated that other exemplary embodiments may include the same or different parts arranged otherwise, for example, depending on validation of messaging to the payment network, etc.

As shown in FIG. 1, the illustrated system 100 generally includes a merchant 102, an acquirer 104, a payment network 106, and an issuer 108, each coupled to network 110. The network 110 may include, without limitation, a wired and/or wireless network, a local area network (LAN), a wide area network (WAN) (e.g., the Internet, etc.), a mobile network, and/or another suitable public and/or private network capable of supporting communication among two or more of the illustrated parts of the system 100, or any combination thereof. In one example, the network 110 includes multiple networks, where different ones of the multiple networks are accessible to different ones of the illustrated entities in FIG. 1. In this example, the network 110 may include a private payment transaction network made accessible by the payment network 106 to the acquirer 104 and the issuer 108 and, separately, a network through which the payment network 106 and merchant 102 may communicate (e.g., via a web-based application, etc.).

In general, in FIG. 1, the merchant 102 offers one or various products (e.g., goods and/or services, etc.), for sale to a consumer. In order to purchase products, the consumer presents a payment device (associated with a payment account) to the merchant 102. In turn, the merchant 102, the acquirer 104, the payment network 106, and the issuer 108 cooperate, in response to the consumer, to complete a transaction (broadly, a purchase transaction) for the product using the consumer's payment account. As part of the purchase transaction, the merchant 102 reads the payment device and communicates, via the network 110, an authorization request to the payment network 106, via the acquirer 104 (associated with the merchant 102), to process the transaction (e.g., using the MasterCard® interchange, etc.). The payment network 106, in turn, communicates the authorization request to the issuer 108 (associated with the consumer's payment account). The issuer 108 then provides an authorization response (e.g., authorizing or declining the request) to the payment network 106, which is provided back through the acquirer 104 to the merchant 102. The transaction with the consumer is then completed, or not, by the merchant 102, depending on the authorization response. If the transaction is completed, the purchase transaction is later cleared and settled by and between the merchant 102 and the acquirer 104 (in accordance with a settlement arrangement, etc.), and by and between the acquirer 104 and the issuer 108 (in accordance with another settlement arrangement, etc.).

The above is a brief description of a transaction to the payment network 106, which is provided for purposes of illustration of the payment network's interactions with other entities. It should be appreciated that multiple messages are directed to the payment network 106 in the above transaction, and further messages may be directed to the payment network 106 as the transaction is subjected to additional services. For example, if the payment account to which the transaction is directed is subject to 3D secure services, one or more additional messages may be directed to the payment network 106 (and specifically a directory backend service therein) to authenticate the consumer, prior to authorizing the transaction.

Further, as part of the transaction above, and multiple transactions like it, transaction data is generated among the merchant 102, the acquirer 104, the payment network 106, the issuer 108, and the consumer. Depending on the transaction, the transaction data may include, without limitation, payment account numbers, merchant IDs, acquirer IDs, terminal IDs, merchant category codes (MCCs) assigned to the merchant 102 (e.g., by the payment network 106, etc.), time stamps, etc. Once generated, the transaction data is stored in one or more different entities of the system 100, and specifically the payment network 106 (e.g., in a data center (not shown) or otherwise).

The transaction data may further provide a basis for a variety of services offered by the payment network 106, through a backend server and/or services offered thereby. Such services may relate to, for example, fraud protection, analytics, marketing insights, rewards, etc. The services may be provided to the entities shown in FIG. 1, or duplicates thereof, or to other parts, such as, for example, third parties that act in cooperation with one or more of the entities of FIG. 1. In the 3D secure example, an authentication entity may include one or more third parties, such as merchant plug-ins (MPIs) (as indicated as included in and/or associated with the merchant 102 in FIG. 1) and/or access control servers (ACSs) (included in and/or associated with the issuer 108 (not shown)). Each is usable in implementing 3D security protocols, to transmit messages to the payment network 106, and to receive messages therefrom, in order to authenticate consumers prior to purchase transactions. It should be appreciated that messages transmitted to the payment network 106, and intended to reach backend servers/services at the payment network 106, may be provided for any different number and/or type of services offered by the payment network 106, to entities shown and not shown in FIG. 1.

As further shown in FIG. 1, the payment network 106 includes one or more backend servers 112, which are provided to host one or a variety of backend services offered by the payment network 106. In this particular embodiment, the backend server(s) 112 exposes multiple APIs to external and/or internal clients, through which one or more of the services may be utilized. The APIs, provided by payment network 106, are accessible through the API gateway 114 (e.g., an XML gateway, etc.) and two recognized computing devices 116 and 118, which are coupled to the API gateway 114. In this exemplary embodiment, the computing devices 116 and 118 are network routers. And, the computing device 116, in this example, is provided for receiving verification messages for the 3D secure protocols (e.g., the Secure-Code® service offered by MasterCard®, etc.), from the merchant 102, via the MPI included in and/or associated therewith, and also the ACS included in and/or associated with the issuer 108 (not shown). In addition, computing device 118 coordinates messaging to/from IPsec, or other security protocols, virtual private networks (VPNs) and to/from clients (via DMZ computing devices, or perimeter networks, etc.), generally internal to the payment network 106. Uniquely, the API gateway 114 includes a local repository 124, which is provided in memory of the API gateway 114. The local repository 124 includes certificate validation data, specific to recognized computing devices 116 and 118 only, whereby the recognized computing devices 116 and 118 may be validated internally at the API gateway 114 without having to access other devices (e.g., global access manger, etc.) (yet other unrecognized computing devices cannot be validated internally at the API gateway 114). In particular, the local repository 124 includes the distinguished name of the client certificates of the computing devices 116 and 118.

Further, as shown, the payment network 106 includes an intermediate computing device 122, between the client and the computing device 116, which is further included. The intermediate computing device 122 generally includes a router (e.g., an edge router, etc.), which may include, in this example, load balancing and/or application firewall functionality. The computing device 122 may be, in some embodiments, a data center (or IDC) F5 computing device. Also, in this exemplary embodiment, the payment network 106 further includes two additional computing devices. One computing device is a lightweight directory access protocol (LDAP) computing device 126, which is configured as the data repository to be used by a global access manger within the payment network 106, for validation of internal and external clients. And, the other computing device is a security services computing device (SSCD) 128, which is configured to generate security tokens accepted within the payment network 106, and specifically, by the backend server(s) 112 and services offered thereby.

While each of the above computing devices is illustrated as separate, in this particular embodiment, it should be appreciated that certain of the computing devices may be integrated together, or further separated, in other payment network embodiments. Further, other computing devices may be employed, in addition to, or in place of one or more of the computing devices illustrated in FIG. 1. For example, the API gateway 114 is only coupled to two recognized computing devices 116 and 118 to receive client messages. It should be understood that a different number of computing devices may be "recognized" computing devices to the API gateway 114 in other embodiments, depending on, for example, the services offered by the backend server(s) 112, volume of client messaging, a payment network topology, etc.

Figure 2:
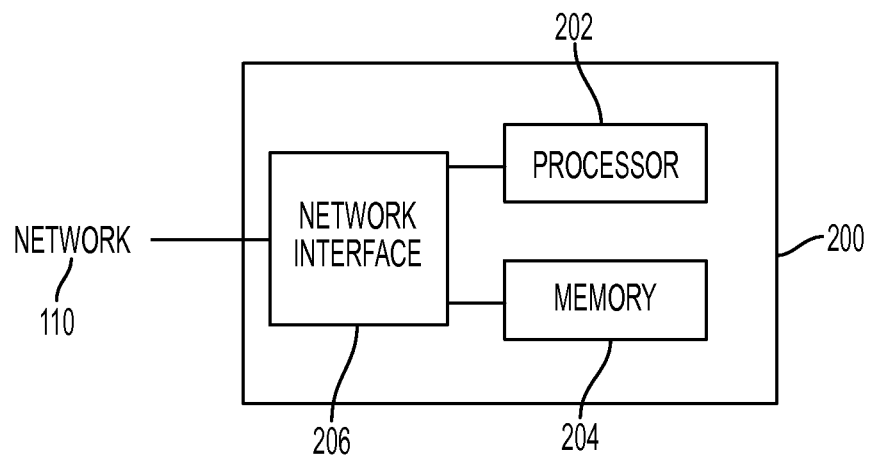
FIG. 2 is a block diagram of a computing device, that may be used in the exemplary payment network illustrated in FIG. 1.

FIG. 2 illustrates exemplary computing device 200, which is suitable for use in the system 100. By way of example (and without limitation), the exemplary computing device 200 may include one or more servers, workstations, computers, routers, gateways, or combinations thereof, etc., as appropriate. In the system 100 (of FIG. 1), the merchant 102, acquirer 104, and the issuer 108 are each associated with, or implemented in, a computing device 200. Further, the backend server(s) 112, the API gateway 114, each of the computing devices 116, 118 and 122 are consistent with the computing device 200. With that said, it should be understood that the system 100 is not limited to the computing device 200, as different computing devices and/or arrangements of computing devices may be used. It should also be understood that different parts and/or arrangements of parts may be used in other computing devices. Furthermore, in various exemplary embodiments, the computing device 200 may include multiple computing devices located in close proximity, or distributed over a geographic region.

With reference to FIG. 2, the illustrated computing device 200 generally includes a processor 202, and a memory 204 that is coupled to the processor 202. The processor 202 may include, without limitation, one or more processing units (e.g., in a multi-core configuration, etc.), including a general purpose central processing unit (CPU), a microcontroller, a reduced instruction set computer (RISC) processor, an application specific integrated circuit (ASIC), a programmable logic circuit (PLC), a gate array, and/or any other circuit or processor capable of the functions described herein. The above examples are exemplary only, and are not intended to limit in any way the definition and/or meaning of processor.

The memory 204, as described herein, is one or more devices that enable information, such as executable instructions and/or other data, to be stored and retrieved. The memory 204 may include one or more computer-readable storage media, such as, without limitation, dynamic random access memory (DRAM), static random access memory (SRAM), read only memory (ROM), erasable programmable read only memory (EPROM), solid state devices, CD-ROMs, tapes, flash drives, hard disks, and/or any other type of volatile or nonvolatile physical or tangible computer-readable media. The memory 204 may be configured to store, without limitation, transaction data, certificates, security technologies, security tokens (e.g., SAML tokens, etc.) and/or any other types of data suitable for use as described herein, etc. Furthermore, in various embodiments, computer-executable instructions may be stored in the memory 204 for execution by the processor 202 to cause the processor 202 to perform one or more of the functions described herein, such that the memory 204 is a physical, tangible, and non-transitory computer-readable storage media. It should be appreciated that the memory 204 may include a variety of different and/or separate memories, each implemented in one or more of the functions or processes described herein.

In addition, the illustrated computing device 200 includes a network interface 206 coupled to the processor 202 (and, in some embodiments, to the memory 204 as well). The network interface 206 may include, without limitation, a wired network adapter, a wireless network adapter, a telecommunications adapter, or other device capable of communicating to one or more different networks, including the network 110. In some exemplary embodiments, the computing device 200 includes one or more network interfaces 206 incorporated into or with the processor 202.

Referring again to FIG. 1, the payment network 106, in this embodiment, is configured to perform multiple levels of authentication of messages received from, for example, the merchant MPI, other external clients, and/or internal clients 120 (broadly, clients). In the exemplary embodiment of FIG. 1, messages permitted in the payment network 106 are SSL messages, or mutual SSL (MSSL) messages, or TLS messages or Mutual TLS (MTLS) messages, etc. It should be appreciated that other payment network embodiments, however, may include other, different types of messaging and/or protocols to provide security based on certificates or otherwise, etc.

Upon receipt of a message from the merchant MPI, for example, the intermediate computing device 122 is configured to append the client certificate (associated with the client sending the message) to the message as an object, and then transmit the message to the API gateway 114, via the computing device 116, which likewise appends its certificate to the message. Similarly, the computing device 118 is configured to, for internal messages, in this embodiment, append the client certificate to the message as an object and further append its own certificate to the message.

In turn, the API gateway 114 is configured to initially validate the computing device 116/118 based on the local repository 124 therein. For instance, the API gateway 114 may access validation variables stored on the local repository 124 which include data, such as authenticated device name (DN), for identifying computing devices which are allowable. The validation variables are compared against data in the certificates (e.g., request.authenticatedDN, etc.) appended to messages by computing devices (e.g., computing devices 116 and 118). If the comparison succeeds, the computing devices are authenticated. In some embodiments, the API gateway 114 may assign the authenticated device name to a context variable (e.g., _mc_authenticatedDN, etc.) which maintains the authenticated status of the computing device throughout the interaction. If the authentication fails, the API gateway 114 may handle the failure by stopping the validation process and providing a message explaining why the authentication failed.

Then, the API gateway 114 is configured to validate the client, from which the message was transmitted, by use of the appended object, which is the client certificate. To do so, the API gateway 114 is configured to call the LDAP computing device 126 (employed as the global access manager) (i.e., the local repository does not include content to validate each client to the payment network 106). When each is validated, the API gateway 114 is configured to then generate an internal security token, which is converted to a security token accepted by the backend server(s) 112, after which the message (including the security token) is transmitted to the backend server(s) 112, whereby the service, to which the message was directed, is invoked as necessary.

Figure 3:
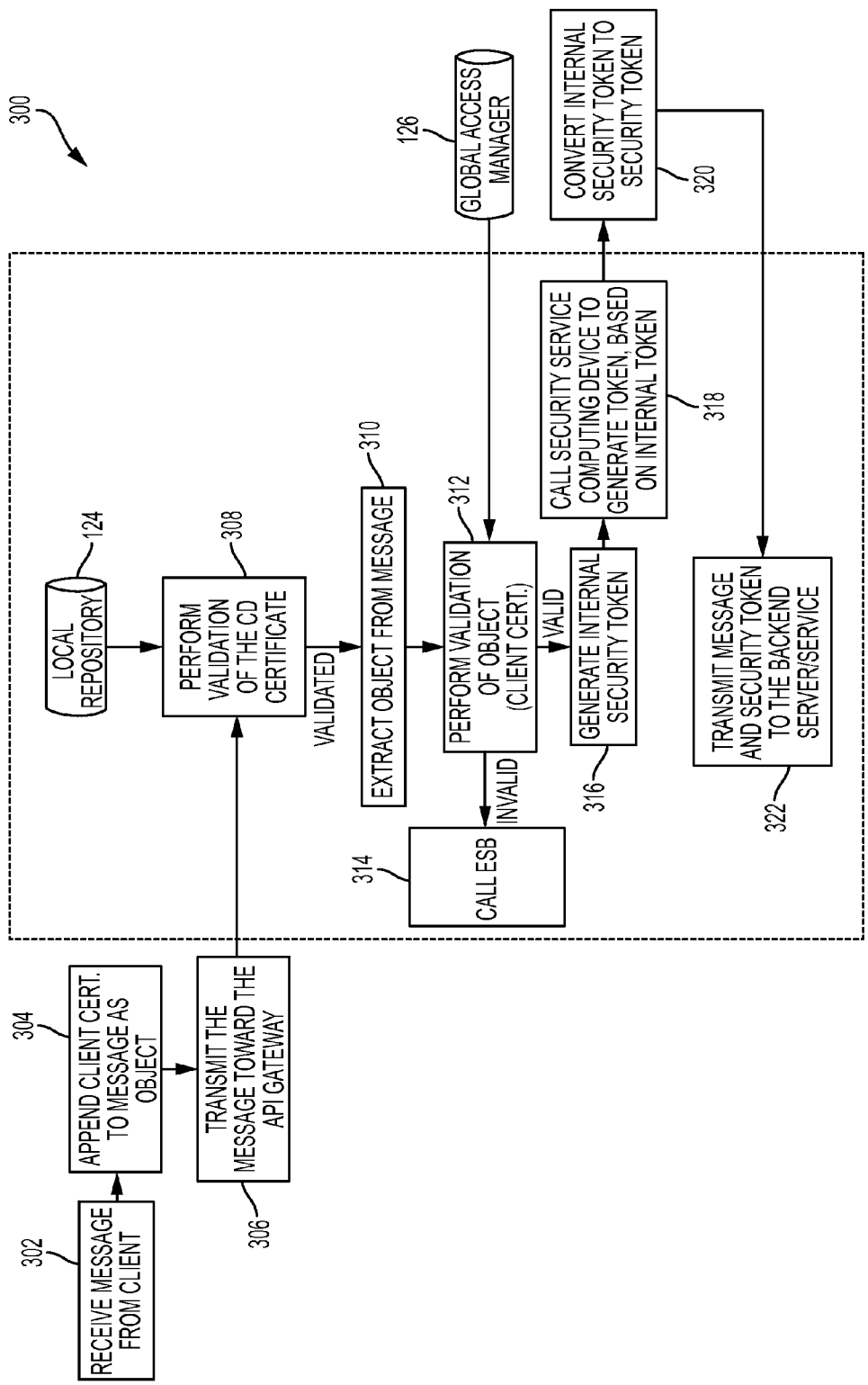
FIG. 3 is an exemplary method, which may be implemented in the payment network illustrated in FIG. 1, for authenticating messaging therein.

FIG. 3 illustrates an exemplary method for use in authenticating messages within the payment network 106, at the client level and further at the computing device level. The exemplary method 300 is described as implemented in the system 100, with further reference to the API gateway 114 and the computing devices 116, 118, and 122 shown in FIG. 1. For example, operations enclosed in the dotted box, in FIG. 3, for example, are included in and/or performed by the API gateway 114, in this exemplary embodiment. The method 300, however, could be implemented in one or more other entities or parts of the system 100 and/or parts of payment network 106, in other embodiments. And, just as the methods herein should not be understood to be limited to the exemplary system 100, or the exemplary computing device 200, the systems and the computing devices herein should not be understood to be limited to the exemplary method 300.

The method 300 is described with reference to a 3D secure message, transmitted by the merchant MPI and received at the intermediate computing device 122, as shown as 130 in FIG. 1. It should be appreciated that a message may be received from one or more other external entities, as shown in FIG. 1 or otherwise, and that the message may be related to any aspect of the payment network 106, but will often be provided to access one or more services offered by the backend server(s) 112, through one or more APIs. Further, messages may be received at the computing device 118, for example, from one or more entities internal to the payment network 106, as indicated by the dotted block 120 (e.g., internal clients, etc.), to again access one or more services offered by the backend server(s) 112, through one or more APIs.

Referring again to FIG. 3, at 302, a message (e.g., a TLS message, etc.) is received at the computing device 122 from the external client, and specifically, in this example, the merchant 102 (and/or acquirer 104), via an MPI. The MPI message, as indicated above, is provided to authenticate a consumer in connection with a payment account transaction, pursuant to a 3D secure protocol, etc. The MPI message is received at the computing device 122, via network 110 (as indicated by 130 in FIG. 1). The network 110, in this example, is a HTTP-type network, such that the message received includes a HTTP message. It should be understood, however, that different types of networks may be employed in other examples, whereby the message may be of a different type or provided according to different protocols. Also, the message received from the client includes a client certificate for the external client, i.e., the merchant MPI, and in particular, a TLS certificate.

Upon receipt of the message, the intermediate computing device 122 validates the client certificate. If the client is validated, the intermediate computing device 122 appends the client certificate, at 304, to the message as an object, and specifically, in this embodiment, as an X509 object. The X509 object may be appended to the HTTP header, or elsewhere in the message. The intermediate computing device 122 further appends its certificate to the message and transmits, at 306, the message to the API gateway 114, via the computing device 116. The computing device 116, for this message, does perform validation of the client certificate, but otherwise acts as a pass-thru, whereby the computing device 116 merely appends the certificate to the message. The certificate includes a distinguished name (DN), which is a unique identifier of the computing device 116. It should be appreciated that the computing device 116 may perform one or more additional operations related to further validate and/or verify the message, or filtering the message received from the computing device 122, prior to passing it along to the API gateway 114.

The API gateway 114 receives the message, and at 308, validates the certificate from the computing device 116. In particular, the API gateway 114 relies on certificate validation data in its local repository 124 to validate the certificate of the computing device 116 to confirm it is a recognized computing device with which the gateway 114 is permitted to communicate. The validation may include merely comparing the distinguished name included in the certificate to a listing of recognized distinguished names in the local repository 124. More often, the API gateway 114 performs a full validation of the message (received via TLS channel) by performing a handshake between the computing device 116 and the API gateway 114 to validate the Certificate Authority trust chain from the computing device 116. Once the handshake is successful, the message reaches the gateway 114, as described above. The API gateway 114 compares the Distinguished Name (DN) of the client certificate from the incoming message, representing the computing device 116, with a list, stored in local repository 124, of predefined DN values for all computing devices that the API gateway 114 has previously authorized. If a match is found, the matched message is successfully validated. In this manner, validation of the message as to the certificate for the computing device 116 is performed locally to the API gateway 114, without requiring communicating with a separate certificate authority, such as, for example, the global access manager which makes use of the LDAP computing device 126.

If the validation reveals the message did not come from a recognized computing device, the API gateway 114 terminates the message, and/or initiates one or more security reviews of the message, etc.

Conversely, if the message is validated to the computing device 116, the API gateway 114 extracts the object, and specifically, in this example, the X509 object, from the message, at 310. Then, at 312, the API gateway 114 performs validation of the object (i.e., the client certificate) for the client providing the message, that is, the merchant MPI in this example. The validation of the client certificate, as shown in FIG. 3, in this exemplary embodiment, requires the API gateway 114 to access the data repository of the global access manager 126 (e.g., the LDAP database), in which credentials for clients are stored (e.g., in memory 204, etc.). Based on this access, the API gateway 114 then performs, at 312, validation of the certificate according to known techniques.

In most cases, if the message is invalid or not validated, the message will be rejected. However, in this exemplary embodiment, if the message is invalid or not validated because the client or merchant MPI 102 is unknown, the API gateway 114 calls a backend service in the backend server(s) 112 to provision a new client, which includes the enterprise service bus (ESB), at 314. Generally, when the certificate or the merchant MPI 102 is unknown or new to the payment network 106, the API gateway 114 calls to the backend service, which, in turn, registers the client, or merchant MPI 102. The registration of the merchant MPI 102 is then provided, from the backend server(s) 112, to the global access manager 126, thereby creating the client identifier for the merchant MPI 102. The client identifier is then provided to the API gateway 114, which in turn, generates the token for the message as described below.

Conversely, if the message is validated, the API gateway 114 causes a security token to be generated for the message and/or the client. In particular, the API gateway 114 generates an internal security token, at 316. The internal security token, in this example, includes a SAML (security assertion markup language) token, which is specific to the client. The API gateway 114 then calls the SSCD 128, at 318. In responses, as shown in FIG. 3, the SSCD 128 converts, at 320, the internal security token into the security token which may be recognized by other parts of the payment network 106, including the backend servers(s) 112 and services provided thereby. After the conversion, the security token, which is also a SAML token in this example, is reverted to the API gateway 114 and is then transmitted to the backend server(s) 112 along with the message, at 322. In response, the backend server(s) 112, and/or a provider of transaction data, or other services, is permitted to facilitate additional messages, as required by the particular service requested. In this exemplary embodiment, in response to the MPI message, the directory service in the backend server 112 verifies the enrollment status of the payment account, whereby the 3D secure protocol, for the transaction, may be continued.

Apart from the intermediate computing device 122 and the computing device 116, messages may originate from a variety of other sources, including internal clients 120, as noted above. In such instances, the message is received at computing device 118 (as described with reference to step 304), which operates to append the client certificate to the message as an object (e.g., an X509 object, etc.) (and further append its own certificate to the message), and pass the message along to the API gateway 114, as described above. The API gateway 114 then performs consistent with steps 308-318 and 322 for the message.

In the manner described above, the API gateway 114 provides a dual level of authentication of the message, at the client level and further at the computing device level (relying on a local repository) to ensure the message is received from a recognized computing device. Thus, messages, which are received as API messages from internal or external clients, are validated at two levels prior to permitting the message to pass through to backend servers and/or backend services, within the payment network 106. The security of messages to the payment network 106, and specifically API messages, in various exemplary embodiments, is subject to enhanced security, whereby the confidential and/or sensitive information included in messages to, from and/or through the payment network 106 are further protected from unauthorized accesses.

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of: (a) receiving an API message from a client, the API message including a client certificate; (b) appending the client certificate to the message as an object; (c) appending an intermediate certificate to the message, the intermediate certificate indicative of the computing device; (d) transmitting the appended messaged to an API gateway, the API gateway including a repository defining recognized computing devices; (e) performing, by the API gateway, validation of the computing device based on an intermediate certificate identifying the computing device as one of the recognized computing devices, via the repository; (f) performing, by the API gateway, validation of the client based on the client certificate via a global access manager, separate from the repository; and (g) causing a security token indicative of the client to be generated, or generating an internal security token, when the computing device is validated, whereby the security token is indicative of the client and permits the message, from the client, to be delivered to one or more backend services.

With that said, exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," "coupled to," "associated with," or "included with" another element or layer, it may be directly on, engaged, connected or coupled to, or associated with the other element or layer, or intervening elements or layers may be present. As used herein, the term "and/or" includes any and all combinations of one or more of the associated listed items.

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for use in providing authentication of an application programing interface (API) message to a network, the method comprising:

receiving an API message from a client, the API message including a client certificate;

appending, by a computing device, the client certificate to the message as an object;

appending, by the computing device, an intermediate certificate to the message, the intermediate certificate indicative of the computing device;

transmitting, by the computing device, the appended messaged to an API gateway, the API gateway including a repository defining recognized computing devices;

performing, by the API gateway, validation of the computing device based on the intermediate certificate identifying the computing device as one of the recognized computing devices, via the repository;

performing, by the API gateway, validation of the client based on the client certificate via a global access manager, separate from the repository; and causing a security token indicative of the client to be generated, when the computing device is validated, whereby the security token is indicative of the client and permits the message, from the client, to be delivered to one or more backend services.

2. The method of claim 1, wherein performing validation of the computing device includes validating a distinguished name of the intermediate certificate as consistent with the one of the recognized computing devices; independent of the global access manager.

3. The method of claim 1, wherein causing the security token to be generated includes:
generating an internal security token, when the computing device is validated and the client is validated; and
causing a security service computing device to convert the internal security token into said security token; and
transmitting the message including said security token to the one or more backend services indicated by said message.

4. The method of claim 3, wherein at least one of the internal security token and said security token includes a SAML token.

5. The method of claim 1, further comprising validating, by the computing device, the client based on the client certificate via the global access manager, prior to appending the client certificate to the message as the object.

6. The method of claim 1, wherein the object includes an X509 object; and
wherein appending the client certificate to the message includes appending the X509 object to a header of the API message.

7. The method of claim 1, wherein the message includes an HTTP request; and
wherein appending the client certificate to the message includes appending the client certificate, as an X509 object, to a header of the HTTP request.

8. The method of claim 1, wherein the client includes a merchant plug-in (MPI) associated with a 3D secure protocol; and
wherein the message includes an authentication request.

9. The method of claim 1, further comprising terminating the message when the computing device is not validated.

10. A payment network for authenticating messages, the payment network comprising:
an intermediate computing device; and
an XML gateway coupled to an intermediate computing device and including a local repository of recognized computing devices; the XML gateway configured, by executable instructions, to:
receive a message from a computing device, the message including an intermediate certificate and an X509 object;
validate the intermediate computing device based on the intermediate certificate and the local repository, as one of the recognized computing devices;
extract the X509 object from the message and validate a client based on the X509 object; and
transmit a security token indicative of the client to a service provider of the payment network, as indicated in the message, when the intermediate computing device is validated.

11. The payment network of claim 10, further comprising a data repository of a global access manager; and
wherein the XML gateway is configured to call to the data repository to validate the client based on the X509 object, but not to validate the intermediate computing device.

12. The payment network of claim 11, wherein the intermediate computing device is configured to receive the message from a client, the message including a client certificate; to validate the client computing device based on the client certificate; and to append the client certificate to a header of the message as the X509 object.

13. The payment network of claim 12, wherein the XML gateway is configured to cause a client ID to be generated, when the intermediate computing device and the client are validated, but no client ID exists in the global access manager.

14. The payment network of claim 11, further comprising a security service computing device coupled to the XML gateway; and
wherein the XML gateway is configured to generate an internal security token when the computing device and the client are validated, and to transmit the internal security token to the security service computing device; and
wherein the security service computing device is configured to convert the internal security token into the security token and to revert the security token to the XML gateway, whereby the security token is accepted as validation by one or more backend servers.

15. The payment network of claim 10, wherein the XML gateway is further configured to terminate the message when the intermediate computing device is not one of recognized computing devices defined by the local repository.

16. The payment network of claim 15, wherein the local repository includes a list of distinguished names for each computing device from which the XML gateway is authorized to receive messages.

17. The payment network of claim 10, wherein the XML gateway is configured to internally validate the intermediate computing device based on a distinguished name included in the intermediate certificate and the local repository.

18. A non-transitory computer readable media including executable instructions for providing authentication of an application programing interface (API) message to a payment network, which when executed by at least one processor, causes the at least one processor to:
receive an appended API message from a computing device, the appended API message including a client certificate associated with a client and an intermediate certificate, the intermediate certificate indicative of said computing device;
perform a validation of the computing device based on the intermediate certificate identifying said computing device as a recognized computing device, via a repository defining recognized computing devices;
perform a validation of the client based on the client certificate via a global access manager, separate from the repository; and
cause a security token indicative of the client to be generated, when the computing device is validated, whereby the security token is indicative of the client and permits the message, from the client, to be delivered to one or more backend services for the payment network.

19. The non-transitory computer readable media of claim 18, wherein the client certificate includes an X509 object appended to a header of the appended API message.

20. The non-transitory computer readable media of claim 18, wherein the executable instruction that, when executed by the at least one processor, causes the at least one processor to perform the validation of the computing device includes performing validation of a distinguished name associated with said certificate as consistent with the one of the recognized computing devices, independent of the global access manager.

\* \* \* \* \*